3,141,867
CROSS-LINKING POLYMERIC MATERIALS

Chester E. Smith, Jr., Wilmington, Del., assignor to Hercules Powder Company, Wilmington, Del., a corporation of Delaware
No Drawing. Filed June 30, 1960, Ser. No. 39,820
7 Claims. (Cl. 260—85.1)

This invention relates to the curing or cross-linking of organic polymeric materials.

Compositions to be cured by the action of heat must be stable against premature cure during processing and be readily cured by heating to a somewhat higher temperature at which cure takes place without decomposition of the polymeric materials of the composition.

In accordance with the present invention it has now been found that compositions of organic polymeric materials containing α-phenylazoisobutyronitrile as a curing agent are readily compounded and processed at usual processing temperatures without scorching and are readily cured by heating at temperatures above about 300° F.

The compositions of organic polymers that are cured by the process of this invention are the polyolefins, natural rubber and synthetic rubber. The organic polymers that have some residual unsaturation cure more rapidly at lower temperatures than those which have none, but residual unsaturation is not necessary for curing in accordance with this invention.

The polyolefins which exemplify organic polymers having substantially no residual unsaturation and which are cured by heating with α-phenylazoisobutyronitrile are the solid polymers of the lower monoolefins of 2–4 carbons. This includes particularly homopolymers of ethylene and propylene and ethylene-propylene copolymers, whether linear atactic, crystalline, nonlinear isotactic, or amorphous. The methods of preparing linear atactic polymers using various ionic catalysts such as Ziegler catalysts, and of preparing nonlinear amorphous polymers using peroxide catalysts are well known in the art.

The polymers which contain some residual unsaturation include natural rubber, neoprene, and the synthetic polymers in which polyunsaturated olefins of 4–6 carbon atoms are polymerized or are copolymerized with other unsaturated polymerizable compounds. Synthetic polymers of this type include copolymers of monounsaturated compounds having up to 8 carbon atoms such as styrene, acrylonitrile, vinylacetate, alkyl acrylates, haloacrylates, vinylidene chloride, isobutylene, alkyl fumarates, alkyl maleates, ethylene and propylene, with the polyunsaturates, such as butadiene-1,3, isoprene, chloroprene, and higher polyenes. In synthetic rubber, such as butyl rubber, the polyolefin may constitute 0.25 to 8% of the polymeric material; in Buna S and Buna N the polyolefin may constitute up to 50–80% of the polymer. In butyl rubber the polyolefin is usually butadiene-1,3, or isoprene, and the olefin, isobutylene. The composition of Buna S is 50–80% butadiene-1,3 and 20–50% styrene, while Buna N is a copolymer of 50–80% butadiene-1,3 and 20–50% acrylonitrile.

The compositions for curing in accordance with this invention are produced by a rolling or mixing mill in the manner customarily used in the rubber industry with warm or cooled rollers to control the heat during the milling process. The temperature of the composition is kept at a temperature below about 275° C. during this milling operation.

Besides the vulcanizable polymer, there may also be incorporated mineral fillers of various kinds such as carbon black, silica, magnesium and calcium carbonates, magnesium and calcium silicates, clays, zinc oxide and organic fillers and plasticizers such as reclaimed rubber, factice, and stearic acid.

The α-phenylazoisobutyronitrile may be incorporated into the mix at any phase of the mixing process, and the usual practice of the rubber industry may be followed advantageously. The amount of α-phenylazoisobutyronitrile added to the composition varies from about 0.5 to about 10 parts per hundred based on the amount of polymer depending on the extent of cure desired and the particular polymer involved. The amount is preferably about 1 to about 5 parts. For instance 0.5 to 5 parts may be used for polymers of appreciable unsaturation while 5 to 10 parts may be used for polymers of low unsaturation.

The compositions when ready for curing may be molded or shaped and heated to the curing temperature as in the conventional rubber curing processes. The curing temperature is in the range of 300° F. to about 500° F. The time of curing decreases with increase in temperature and varies with the particular polymer and fillers in the composition.

The following examples illustrate the manner of compounding and curing polymer compositions in accordance with this invention. All parts and percentages are by weight. Percent gel which is indicative of cure was determined by macerating a weighed sample in xylene for 16 hours at 84° C., decanting excess solvent, blotting the sample surfaces, and drying at 60° C./20 mm. for 4 hours.

$$\text{Percent gel} = \frac{\text{final dry weight} \times 100}{\text{original weight}}$$

Example 1

α-Phenylazoisobutyronitrile was prepared by oxidizing α-phenylhydrazoisobutyronitrile with silver oxide. This oxidation was carried out by adding 108 parts silver oxide gradually to a mixture of 60 parts α-phenylhydrazoisobutyronitrile in about 280 parts diethyl ether in a flask with provisions for reflux cooling of the ether. After spontaneous heating of the ether to its boiling point had ceased, the mixture was refluxed at the boiling point of the ether until the oxidation was complete. The ether was evaporated and replaced by petroleum ether and cooled to obtain crystalline α-phenylazoisobutyronitrile which melts at 9–10° C. and boils at 68–86° C./0.17 mm.

The α-phenylhydrazoisobutyronitrile used in this preparation was made by mixing 135 parts phenylhydrazine with 106.5 parts acetone cyanohydrin in about 100 parts dry diethyl ether and allowing the reaction to proceed at 25–30° C. for ten days. During this time a layer of water separated and was removed. The diethyl ether was replaced by petroleum ether, and the α-phenylhydrazoisobutyronitrile amounting to 129 parts allowed to crystallize. It melted at 50–65° C. before purification and at 69–70° C. after purification.

One hundred parts poly(ethylene 66.7%–propylene 33.3%), 50 parts carbon black, 5 parts zinc oxide and 1 part stearic acid were mixed at 200° F. on a two-roll mill for 5 minutes with 1 to 4 parts α-phenylazoisobutyronitrile. Samples were sheeted and cured under hydraulic pressure at 350–360° F. for 75 minutes and then tested for percent gel in xylene. The results were as follows:

| α-Phenylazoisobutyronitrile: | Percent gel |
|---|---|
| 1.0 part | 52.8 |
| 2.0 parts | 54.0 |
| 4.0 parts | 52.5 |

Example 2

One hundred parts high-density polyethylene was masticated with 100 parts carbon black and 0.67 parts α-phenylazoisobutyronitrile at 260–270° F. for 10 minutes under nitrogen. The resulting mix was then sheeted and cured under hydraulic pressure at 350° F. for 5 minutes.

The cured sample showed 56.0% gel when tested in decahydronaphthalene in place of xylene in the gel test.

*Examples 3–5*

One hundred parts low-density polyethylene, and 100 parts carbon black were masticated at 240° F. for 10 minutes under nitrogen with 0.67 part to 2.01 parts α-phenylazoisobutyronitrile. The resulting mix was then sheeted and cured under hydraulic pressure at 350–500° F. for 5 to 45 minutes. The cured samples were tested for percent gel in xylene. The results of these tests are set forth below:

|  | α-Phenyl-azoisobutyr-onitrile | Cure Temperature | Gel Analysis |
|---|---|---|---|
| 3a | .67 | 500° F. (5 Min.) | 52.8 |
| b | .67 | 450° F. (5 Min.) | 53.3 |
| c | .67 | 400° F. (5 Min.) | 52.7 |
| 4a | 1.34 | 500° F. (5 Min.) | 53.0 |
| b | 1.34 | 450° F. (5 Min.) | 53.3 |
| c | 1.34 | 400° F. (5 Min.) | 53.2 |
| 5a | 2.01 | 450° F. (15 Min.) | 55.9 |
| b | 2.01 | 450° F. (30 Min.) | 56.2 |
| c | 2.01 | 450° F. (45 Min.) | 54.7 |
| d | 2.01 | 400° F. (15 Min.) | 55.1 |
| e | 2.01 | 350° F. (15 Min.) | 52.7 |

*Example 6*

A standard styrene-butadiene rubber-carbon black formulation was made using 100 parts synthetic rubber, 50 parts high abrasion furnace black (HAF), 5 parts zinc oxide, 1.0 part stearic acid, and 0.8 part α-phenylazoisobutyronitrile and mixing on a two-roll mill at 100–125° F. The composition was then sheeted and cured by heating at various lengths of time and tested for physical properties. The following data were obtained:

| Cure Time, Minutes (° F.) | Modulus (300%) | Tensile Strength |
|---|---|---|
| 30 (360) | 1,410 | 3,040 |
| 60 (340) | 1,080 | 2,660 |
| 60 (350) | 1,560 | 2,990 |
| 60 (360) | 2,120 | 3,115 |
| 90 (320) | 330 | 1,220 |
| 90 (340) | 1,590 | 2,950 |
| 90 (350) | 1,800 | 3,040 |
| 120 (320) | 930 | 2,530 |

The increase in cure with time and temperature is indicated by the increase in modulus and tensile strength.

What I claim and desire to protect by Letters Patent is:

1. A method of curing a solid organic polymeric material selected from the group consisting of natural rubber, neoprene, synthetic homopolymers and copolymers of monomers consisting of monoolefins of 2–4 carbon atoms, homopolymers of diolefins of 4–6 carbon atoms, copolymers of said diolefins with monounsaturated monomers having up to 8 carbon atoms, and copolymers of olefinic hydrocarbons of 2–4 carbon atoms with ethylenically polyunsaturated copolymerizable monomeric compounds other than said diolefins which comprises heating said polymeric material with α-phenylazoisobutyronitrile at a temperature in the range of about 300° F.–500° F.

2. The process of claim 1 in which the polymeric material is natural rubber.

3. The process of claim 1 in which the polymeric material is a styrene-butadiene synthetic rubber.

4. The process of claim 1 in which the polymeric material is polyethylene.

5. The process of claim 1 in which the polymeric material is polypropylene.

6. The process of claim 1 in which the polymeric material is a copolymer of ethylene and propylene.

7. A method of curing a solid polymer of ethylene which comprises heating said polymer with 2-phenylazoisobutyronitrile at a temperature over 140° C.

References Cited in the file of this patent
UNITED STATES PATENTS

| 2,375,987 | Garvey | May 15, 1945 |
| 2,471,959 | Hunt | May 31, 1949 |
| 2,520,339 | Robertson | Aug. 29, 1950 |
| 2,830,978 | Muller | Apr. 15, 1958 |